C. HERMAN, M. L. HEYL & H. T. FRAUENHEIM.
MOLDING MACHINE.
APPLICATION FILED JULY 11, 1907.

908,002.

Patented Dec. 29, 1908.

3 SHEETS—SHEET 1.

WITNESSES.
John J. Power
O. L. Thompson

INVENTORS.
Charles Herman,
Martin L. Heyl,
Harry T. Frauenheim,
By J. N. Cooke,
Attorney

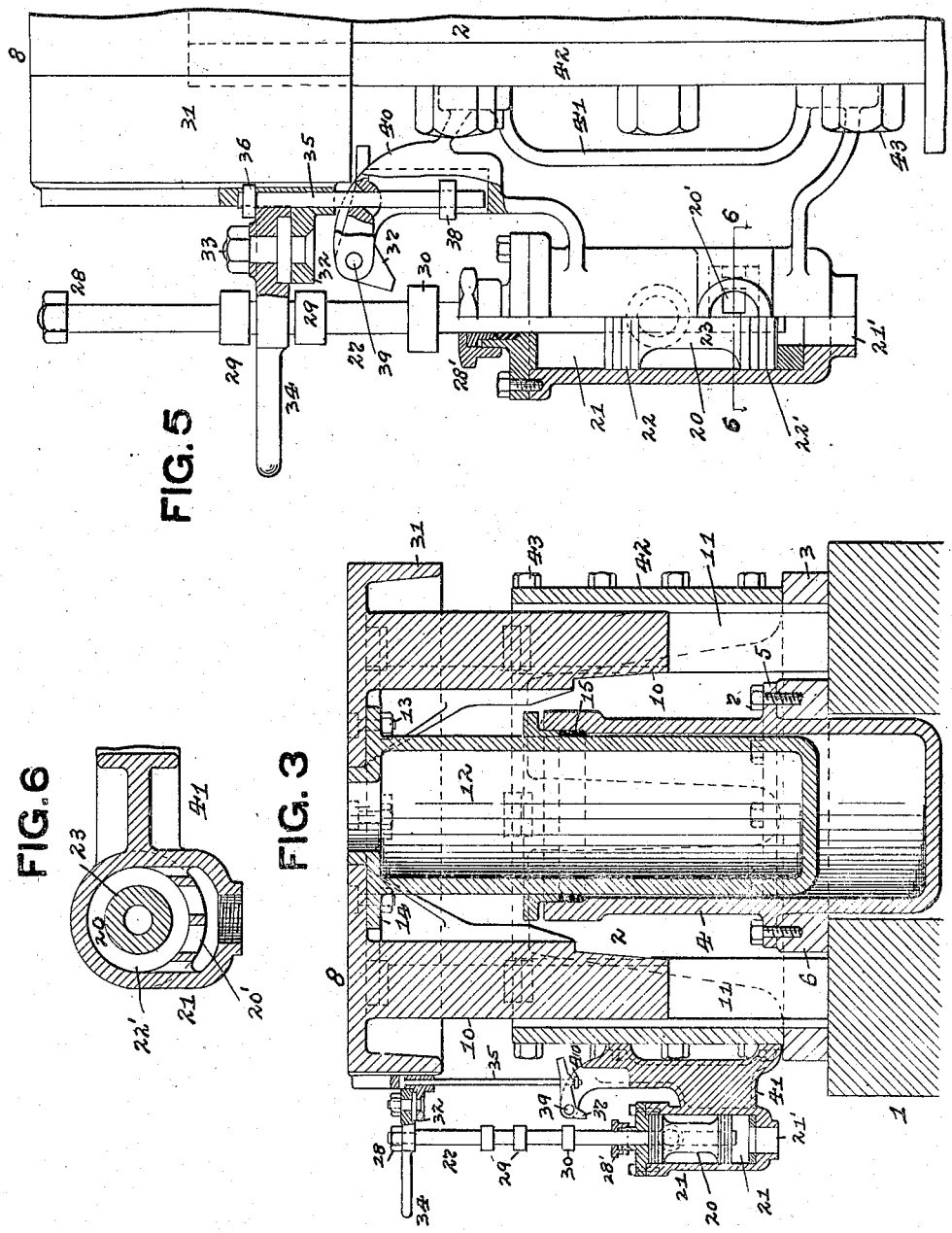

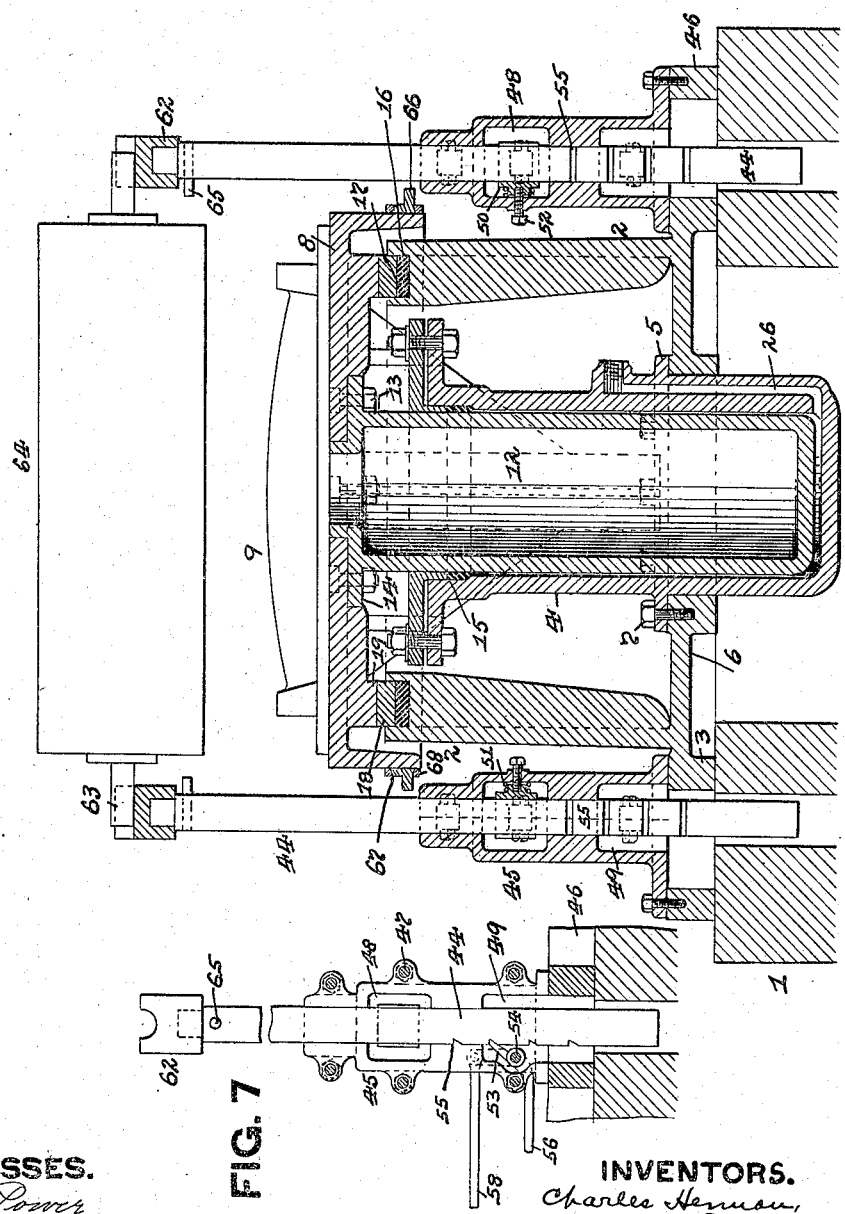

UNITED STATES PATENT OFFICE.

CHARLES HERMAN, OF ALLEGHENY, AND MARTIN L. HEYL AND HARRY T. FRAUENHEIM, OF PITTSBURG, PENNSYLVANIA, ASSIGNORS TO HERMAN PNEUMATIC MACHINE COMPANY, OF ZELIENOPLE, PENNSYLVANIA, A CORPORATION OF PENNSYLVANIA.

MOLDING-MACHINE.

No. 908,002.

Specification of Letters Patent.

Patented Dec. 29, 1908.

Application filed July 11, 1907. Serial No. 383,223.

*To all whom it may concern:*

Be it known that we, CHARLES HERMAN, a resident of Allegheny, in the county of Allegheny and State of Pennsylvania, and MARTIN L. HEYL and HARRY T. FRAUENHEIM, both of Pittsburg, in said county and State, have invented a new and useful Improvement in Molding - Machines; and we do hereby declare the following to be a full, clear, and exact description thereof.

Our invention relates to molding machines, and has special reference to that class of sand molding machines such as is shown, described and claimed in Letters Patent of the United States No. 851,166 granted to Charles Herman on April 23, 1907.

The object of the invention is to provide such a form of a molding machine in which the mold formed within the flask can be jarred evenly and compactly and by a jarring means which will prevent any wabbling of the flask during the jarring operation and will enable a better distribution of the impact in such operation.

Another object of the invention is to provide a means for performing both said jarring operation and the raising of the flask and mold after such operation automatically, so that the flask can be turned on said means for any purpose desired, as well as providing for the lowering of said flask for the jarring operation.

Our invention consists, generally stated, in the novel arrangement, construction and combination of parts, as hereinafter more specifically set forth and described and particularly pointed out in the claims.

To enable others skilled in the art to which our invention appertains to construct and use our improved molding machine, we will describe the same more fully, referring to the accompanying drawings, in which—

Figure 1:
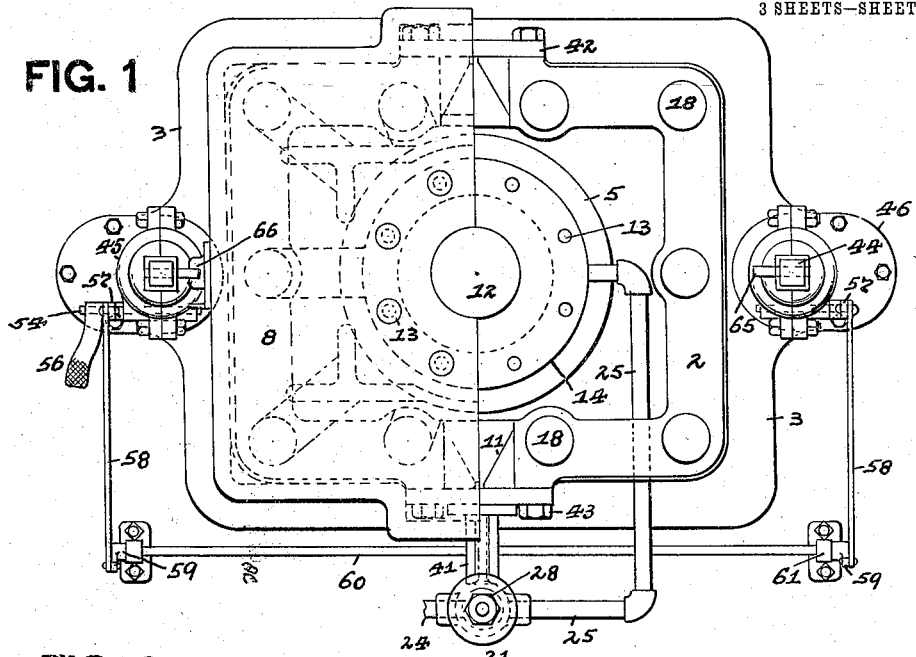
Figure 2:
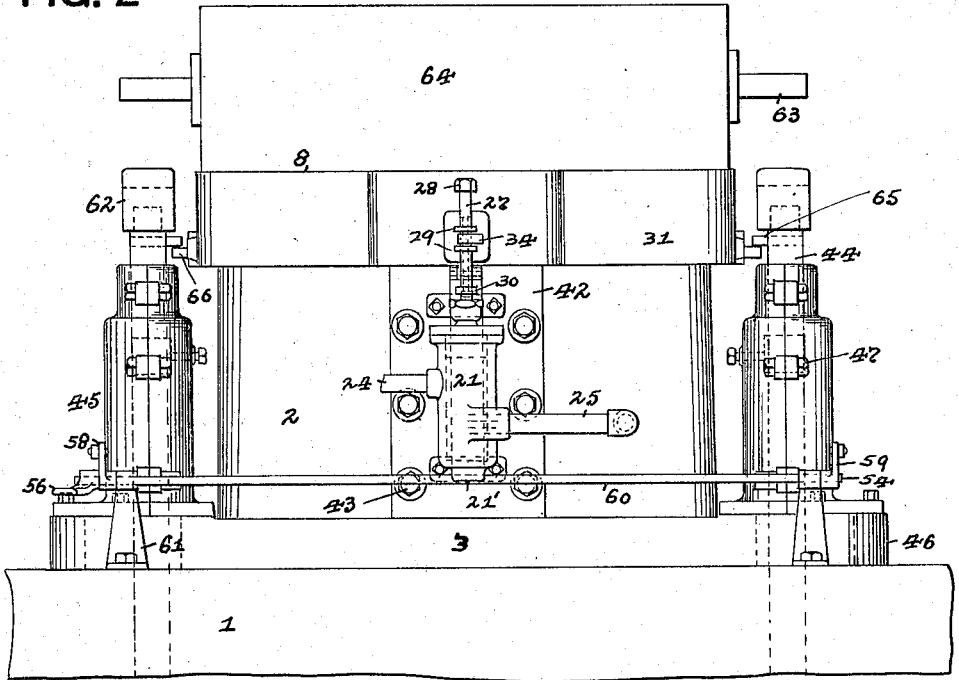

Figure 1 is a plan view of our improved molding machine. Fig. 2 is a side elevation of the same. Fig. 3 is a vertical central section of the machine taken through the jarring and flask raising and lowering valve. Fig. 4 is a like section of the machine taken at right angles to that shown in Fig. 3, and through the lifting bar supports. Fig. 5 is an enlarged side elevation of a portion of the machine showing some of the parts in section. Fig. 6 is a cross-section of the valve on the line 6—6 Fig. 5 and looking in the direction of the arrows. Fig. 7 is a side elevation of one of the lifting bars with one-half of its support removed.

Like symbols of reference herein indicate like parts in each of the figures of the drawings.

As illustrated in said drawings 1 is the base or foundation on which our improved molding machine is supported and upon which rests the casing 2 by its base 3 at the lower end of the same. Within the casing 2 is the cylinder 4, which is supported within said casing by flanges 5 thereon secured upon a plate 6 by bolts 7, which plate extends across and within the casing from the base 3 and such cylinder extends through the same and into a space or opening within the foundation 1.

The pattern-plate is shown at 8 and is adapted to carry the pattern 9, such plate being adapted to be raised and lowered above the casing 2 through V-shaped slides 10 extending down therefrom and moving within like shaped guides 11 formed in the wall of said casing and on opposite sides from each other. Extending down from the pattern-plate 9 is the hollow plunger 12 which is connected to said plate by bolts 13 passing through a flange 14 on the upper end of said plunger, and such plunger is adapted to move within the cylinder 4 and through a stuffing box 15 on the upper end of the same.

Within the upper face of the casing 2 are a series of seats 16 which extend around the same and within each of which is a resilient jarring block 17, preferably formed of rubber or other suitable material. These blocks 17 are shown in circular form but it is evident that they can be formed of other shapes, and fitting within each of the seats 16 and against each of said blocks is a wearing block or plate 18. The pattern plate 8 is provided with a series of projections or lugs 19 extending down from the under face of the same for engaging with the wearing plates 18 in the jarring operation.

On one side of and connected to the casing 2 is a valve chamber 21 which has the exhaust port 21' at its lower end and the ports 20' within the same. Within the chamber 21 is a piston shaped valve 20 having the upper and lower heads 22 and 22' respectively at each end of the same and the contracted portion 23 between them. Leading into the valve chamber 21 from any suitable source of supply is the supply pipe 24 through which air or other fluid is adapted to pass into said chamber and into the cylinder 4 through a pipe 25 leading from opposite the ports 20' in said chamber into said cylinder through a port 26 on one side of said cylinder. A valve stem or rod 27 leads up from the valve 20 through a stuffing box 28' on the upper end of the chamber 21 and is provided with a stop nut 28 at its upper end, while two collars 29 are secured on said rod and a collar 30 is secured on said rod below the collars 29.

The pattern-plate 8 is formed of an inverted cup-shape by an annular flange 31 extending down from the same for fitting around the casing 2 in its lowered position and secured to said flange is a bracket 32 on which is removably pivoted at 33 a hand-lever 34, which is adapted to fit around the valve rod 27 and between the collars 29, as well as engage with the stops 28 in different positions of the said plate 8 and said rod 27. Extending down from the flange 31 on the pattern-plate 8 is a rod 35, which passes through the bracket 32 and lever 34 and is secured thereto and at its upper end by a nut 36 fitting against said lever. This rod 35 passes through one end of a dog 37 and has a collar 38 at the lower end of the same, while such dog is pivoted at 39 on an arm 40 on the bracket 41 of the valve chamber 21 for connecting the same to the casing 2 through the removable plates 42, which carry the guides 11 for the slides 10 on the pattern-plate 8 and are secured to said casing by the bolts 43.

On each side of and exterior to the casing 2 are the vertical flask supporting bars 44 which are supported and movable within standard bearings 45 secured upon projections 46 on the base 3 and extending down through said projections and base and into a space or opening within the foundation 1. These bearings 45 are formed separable and in two parts which are secured together by the bolts 47 and within the same are the chambers 48 and 49. Within each of the chambers 48 is the bearing plate 50 which is held against each of the lifting bars 44 by means of a spiral spring 51 fitting between said plate and the wall of each of said chambers and is adjusted and held in place by means of the adjusting screw 52. Within each of the chambers 49 is a pawl 53 which is secured upon a shaft 54 and is adapted to engage with ratchet face 55 formed on one side of the bars 44. A foot or trip lever 56 is secured upon one of the shafts 54 and on each of said shafts is an arm 57, to the free end of which one end of the rod 58 is pivotally connected, while the opposite end of said rod is pivotally connected to an arm 59 secured upon a shaft 60, which extends alongside of the casing 2 and is journaled in bearings 61 supported on the foundation 1. The upper ends of the bars 44 are provided with a concave bearing block 62 for the reception of the trunnions 63 on the flask 64, and a pin 65 on said bars and adjacent to said block is adapted to engage with a horizontally slidable block 66 fitting within a dovetailed slot 67 on each side of the pattern-plate 8 and within a projection 68 on the flange 31 thereof.

The use and operation of our improved molding machine is as follows—With the parts in their normal position as shown in Fig. 2 and with the sand filled flask 64 resting on the pattern-plate 8 around the pattern 9 the machine is ready for the jarring operation, so that by opening a suitable cock or valve (not shown) in the supply pipe 24 the operating fluid, such as compressed air can enter into valve chamber 21 through said pipe from any suitable storage tank, air pump or other source of supply and such air will then pass from said chamber into the cylinder 4 through the pipe 25 and port 26 which will act to raise the plunger 12 within said cylinder and with it the plate 8 and flask 64. As the plate 8 and flask 64 are thus raised the valve rod 27 on the valve 20 in the chamber 21 will be also raised by means of the lever 24 on said plate engaging with the upper collar 29 on said rod, which will also thereby raise said valve so that the lower head 22' on the valve will be above the opening into the pipe 25, and permit the air within the cylinder 4 to pass out from the same through the port 26 and said pipe and into the chamber 21 below said head, so that it can then escape into the open air through the exhaust port 21'. As the air is thus exhausted from the cylinder 4 the plunger 12 therein will be lowered and thus permit the plate 8 with the flask 64 thereon to be dropped so that the lugs 19 on said plate will engage with the blocks 18 on the resilient jarring blocks 17 to jar the sand within said flasks around the pattern 9. When the plate 8 and flask 64 are thus lowered with the plunger 12 the valve rod 27 will be also lowered by reason of the lever 34 engaging with the lower collar 29 on said rod and thereby lower the valve 20 within the chamber 21, so that the head 22' will come below the entrance to the pipe 25 to permit the air to again enter the cylinder 4 from the pipe 24 through the said chamber, pipe 25 and port 26 for again raising said plunger plate and pattern in another jarring operation, as hereinbefore described. These operations of raising and lowering these parts for the purpose of packing the sand in the flask 64 around the pattern 9 are thus automatically performed and continued as long as the operating fluid is allowed to flow through the supply pipe 24, and upon the closing of the valve within said pipe the plate 8 and flask 64 will be then in their lowered positions and the latter containing the completed mold is then ready for removal from said plate 8.

After the sand within the flask 64 has been thus sufficiently jarred to thoroughly compact it around the pattern 9 by the operations above described and it is desired to raise said flask with its mold cavity from around said pattern, the operator throws back the lever 34 from between the collars 29 and slides the blocks 66 to place for engaging with the pins 65 on the bars 44. The operator then opens the valve in the supply pipe 24 which will act to allow the air to again enter the chamber 21 from said pipe and into the cylinder 4 through the pipe 25 and port 26, thereby raising the plunger 12 and plate 8 and with them the flask 64. After the plate 8 has been thus raised and the lever 34 carried thereby has been raised to pass the upper collar 29 it is thrown outward so that it again fits around or against the rod 27, so that in the continued upward movement of said plate to assume the position shown in Fig. 3 the said lever will engage with the stop-nut 28 on the upper end of the valve rod 27 and draw said rod and valve 20 up to the positions shown in said figure and thereby allow said valve to close off the air from the chamber 21 to the cylinder 4. During the first part of the raising of the plate 8, the rod 35, and before the lever 34 is thrown out to the rod 27 above the upper collar 29, will be also raised so that when the collar 38 on said rod engages with the dog 37, it will throw the same from the path of the collar 30 on the valve rod 27 to allow the rod 27 to continue its movement upwardly. When the dog 37 is in its normal position as shown in Fig. 5 it will act to engage the collar 30 on the rod 27 in case the valve 20 starts to move upward after the lever 34 is thrown out from between the collars 29 on said rod and before it is again thrown back to position against said rod and above the upper collar 29. During this raising of the plate 8 the bars 44 will be also raised by reason of the blocks 66 on said plate engaging with the pins 65 on said bars and when said plate has been raised to the position desired the said bars 44 will be held by reason of the pawls 53 engaging with the ratchet teeth or face 55 on said bars.

Upon the closing of the valve within the pipe 24 after the plunger 12, plate 8, flask 64 and bars 44 have been thus raised, the air within the cylinder 4 will pass out of the same through the port 26 and pipe 25 into the chamber 21 and thence to the open air through the exhaust port 21' which will thereby permit the plunger, plate and flask to be lowered so that the trunnions 63 on said flask will be caught by and engage with the concave blocks 62 on the bars 44 and thereby hold said flask, as shown in Fig. 4, while the plunger 12 and plate 8 are continued in their downward movements to their lowered positions as is shown in said figure during the further exhausting of said air from said cylinder. Before or during this downward movement of the plate 8 and plunger 12 the operator throws back the lever 34 from the position shown in Fig. 3, so that it will be free from the stop nut 28 and rod 27 and during such movement of said plate and plunger and with the exhausting of the air from the cylinder 4 through the chamber 21 to the open air the valve 20 and rod 27 will be lowered, as well as the rod 35, which will thereby return the dog 37 to its normal position and the valve to its lower position, as shown in Fig. 5. When the flask 64 has been thus lowered down into position on the bars 44 through the trunnions 63 on said flask engaging with the blocks 62 on said bars, the said flask is in position for turning and removal from said bars, so that the operator can then place his foot upon the trip 56 and by pressing down on the same the shafts 54 on each side of the machine will be turned through the arms 57 and 59, rods 58 and cross shaft 60, so that the pawls 53 on the shafts 54 will be freed from engagement with the ratchet faces 55 on the bars 44, and thereby permit said bars to be lowered within the bearings 45 to the positions shown in Fig. 2. These bars 44 will be lowered gradually by means of the bearing plates 50 being held against said bars by the springs 51 and they can be adjusted by the screws 52 when desired. When these parts have thus reached their lowered positions, the blocks 66 on the plate 8 are slid out of alinement with the pins 65 on the bars 44 and the valve 20 is in position so that with another flask placed upon the plate 8 and filled with sand, the air can again be applied for another jarring operation, and the later operations repeated for the raising of the flask and completed mold formed thereby, as hereinbefore described.

It will be evident that fluid other than air—such as steam can be used to perform the operations of jarring the flask and the raising of the same through the valve mechanism, while various other modifications and changes in the design, construction and operations of the machine may be resorted to without departing from the spirit of the invention or sacrificing any of its advantages.

It will thus be seen that the various devices for performing the operations of the machine are cheap, simple and efficient for the purposes intended and by their use it has been found that the same within the mold will be easily, rapidly and thoroughly packed around the pattern to form a perfect mold cavity. It has also been found that with the jarring applied directly to the table or pattern plate that this will enable a better and more even distribution of the jarring of the sand throughout the flask in the forming of the mold cavity, as well as to the different parts of the machine, while the valve mechanism employed for such jarring operation and the raising of the flask with the completed mold will enable these operations to be performed easily and quickly and without the employment of any hard or manual labor. It will also be obvious that with the peculiar arrangement of the jarring points that all liability of the tilting or wabbling of the flask and table are overcome and during the raising and lowering of these parts they will be held in perfect alinement, so that in both cases any injury to the patterns or mold cavity is prevented. The parts in their operation are under perfect control at all times and practical experience with the machine renders it capable of forming molds for unusually large sized castings and with perfect ease in handling, as well as through the great durability and strength of the working parts, while the handling and supporting of the mold and flask after the former has been formed is greatly facilitated and after removal of said flask and mold such supporting parts are easily and quietly returned to position for again being raised from another operation.

What we claim as our invention and desire to secure by Letters Patent, is—

1. In a molding machine, the combination of a table or pattern-plate, a cylinder, and a fluid operated plunger connected to said plate and fitting within said cylinder for raising and lowering said plate.

2. In a molding machine, the combination of a table or pattern-plate, means for raising and lowering said plate, and resilient means extending continuously around and engaging with said plate at a distance from the center thereof for cushioning the plate in the jarring action.

3. In a molding machine, the combination of a table or pattern-plate, means for raising and lowering said plate, and resilient jarring blocks extending continuously around and engaging with said plate at a distance from the center thereof for cushioning the plate in the jarring action.

4. In a molding machine, the combination of a table or pattern-plate, means for raising and lowering said plate, a casing, and resilient means extending continuously around said casing for engaging with said plate at a distance from the center thereof to cushion the plate in the jarring action.

5. In a molding machine, the combination of a table or pattern-plate, means for raising and lowering said plate, a casing, and resilient jarring blocks extending continuously around said casing and engaging with said table at a distance from the center thereof to cushion the plate in the jarring action.

6. In a molding machine, the combination of a table or pattern-plate, means for raising and lowering said plate, resilient jarring blocks extending continuously around said casing to cushion the jarring action, and wearing blocks on said jarring blocks for engaging with said plate and at a distance from the center thereof.

7. In a molding machine, the combination of a table or pattern-plate, means for raising and lowering said plate, resilient jarring blocks within and extending continuously around said casing to cushion the jarring action, and wearing blocks on said jarring blocks for engaging with said plate and at a distance from the center thereof.

8. In a molding machine, the combination of a table or pattern-plate, means for raising and lowering said plate, resilient jarring blocks fitting within seats within and extending continuously around said casing to cushion the jarring action, and wearing plates on said blocks and within said seats for engaging with said plate at a distance from the center thereof.

9. In a molding machine, the combination of a table or pattern-plate, a cylinder, a plunger connected to said plate and fitting within said cylinder, and a valve mechanism connected to said cylinder and moving parallel with said plate for automatically raising and lowering said plunger and plate.

10. In a molding machine, the combination of a table or pattern-plate, a cylinder, a plunger connected to said plate and fitting within said cylinder, a valve mechanism connected to said cylinder and moving parallel with said plate for automatically raising and lowering said plunger and plate, and means for limiting the movement of the valve to impart an automatic vertical reciprocatory movement to said plunger and plate.

11. In a molding machine, the combination of a table or pattern-plate, a cylinder, a plunger connected to said plate and fitting within said cylinder, a valve mechanism connected to said cylinder and moving parallel with said plate for automatically raising and lowering said plunger and plate, and means engaging with the stem or rod of the valve for limiting the movement of the valve to impart an automatic vertical reciprocatory movement to said plunger and plate.

12. In a molding machine, the combination of a table or pattern-plate, a cylinder, a plunger connected to said plate and fitting within said cylinder, a valve mechanism connected to said cylinder and moving parallel with said plate for automatically raising and lowering said plunger and plate, and means carried by said plate and engaging with stem or rod of the valve for limiting the movement of the valve to impart an automatic vertical reciprocatory movement to said plunger and plate.

13. In a molding machine, the combination of a table or pattern-plate, a cylinder, a plunger connected to said plate and fitting within said cylinder, a valve mechanism connected to said cylinder and moving parallel with said plate for automatically raising and lowering said plunger and plate, a stem or rod on said valve having stop collars thereon, and a movable lever carried by said plate and fitting between said collars for limiting the movement of said valve to impart a vertical reciprocatory movement to said plunger and plate.

14. In a molding machine, the combination of a table or pattern-plate, a cylinder, a plunger connected to said plate and fitting within said cylinder, a valve mechanism connected to said cylinder and moving parallel with said plate for automatically raising and lowering said plunger and plate, and means for limiting the movement of the valve to impart an automatic vertical reciprocatory movement to said plunger and plate, and for permitting the further raising of said plunger, plate and valve and the lowering of the same.

15. In a molding machine, the combination of a table or pattern-plate, a cylinder, a plunger connected to said plate and fitting within said cylinder, a valve mechanism connected to said cylinder and moving parallel with said plate for automatically raising and lowering said plunger and plate, and means engaging with the stem or rod of the valve for limiting the movement of the valve to impart an automatic vertical reciprocatory movement to said plunger and plate, and for permitting the further raising of said plunger, plate and valve and the lowering of the same.

16. In a molding machine, the combination of a table or pattern-plate, a cylinder, a plunger connected to said plate and fitting within said cylinder, a valve mechanism connected to said cylinder and moving parallel with said plate for automatically raising and lowering said plunger and plate, and means carried by said plate and engaging with the stem or rod of the valve for limiting the movement of the valve to impart an automatic vertical reciprocatory movement to said plunger and plate, and for permitting the further raising of said plunger, plate and valve and the lowering of the same.

17. In a molding machine, the combination of a table or pattern-plate, a cylinder, a plunger connected to said plate and fitting within said cylinder, a valve mechanism connected to said cylinder for automatically raising and lowering said plunger and plate, a stem or rod on said valve having stop collars thereon, and a movable lever carried by said plate and fitting between said collars for limiting the movement of said valve to impart a vertical reciprocatory movement to said plunger and plate, and for permitting the further raising of said plunger, plate and valve and the lowering of the same.

18. In a molding machine, the combination of a table or pattern-plate, a cylinder, a plunger connected to said plate and fitting within said cylinder, a valve mechanism connected to said cylinder and moving parallel with said plate for automatically raising and lowering said plunger and plate in a vertical reciprocatory movement, and means for automatically holding and releasing said valve in a further raising of said plunger and plate and lowering of the same through said valve.

19. In a molding machine, the combination of a table and pattern-plate, a cylinder, a plunger connected to said plate and fitting within said cylinder, a valve mechanism connected to said cylinder for automatically raising and lowering said plunger and plate in a vertical reciprocatory movement, a stem or rod on said valve, and a movable dog engaging with said rod for automatically holding and releasing said valve in a further raising of said plunger and plate and lowering of the same through said valve.

20. In a molding machine, the combination of a table and pattern-plate, a cylinder, a plunger connected to said plate and fitting within said cylinder, a valve mechanism connected to said cylinder for automatically raising and lowering said plunger and plate in a vertical reciprocatory movement, a stem or rod on said valve, a movable dog, and a rod carried by said plate for engaging with said dog to automatically hold and release said valve in a further raising of said plunger and valve and lowering of the same through said valve.

21. In a molding machine, the combination with a flask, a table or pattern-plate, means for raising and lowering said flask and plate, flask supporting bars, and movable means on said plate and engaging with said bars to raise the same for supporting the flask after being raised.

22. In a molding machine, the combination with a flask, a table or pattern-plate, means for raising and lowering said flask and plate, flask supporting bars, and movable blocks on said plate and engaging with said bars to raise the same for supporting the flask after being raised.

23. In a molding machine, the combination with a flask, a table or pattern-plate, means for raising and lowering said flask and plate, flask supporting bars, pins on said bars, and slidable blocks on said plate and engaging with said pins to raise said bars for supporting the flask after being raised.

24. In a molding machine, the combination with a flask, a table or pattern-plate, means for raising and lowering said flask and plate, flask supporting bars adapted to be raised by said plate, and means connected to and between said bars for holding the same in their raised positions and for permitting the lowering of the same.

25. In a molding machine, the combination with a flask, a table or pattern-plate, means for raising and lowering said flask and plate, flask supporting bars adapted to be raised by said plate, pawls engaging with ratchet-faces on said bars, and means connected to and between said pawls for holding the bars in their raised positions and for permitting the lowering of the same.

26. In a molding machine, the combination with a flask, a table or pattern-plate, means for raising and lowering said flask and plate, flask supporting bars adapted to be raised by said plate, pawls engaging with ratchet-faces on said bars, and a tripping device connected to and between said pawls for holding the bars in their raised positions and for permitting the lowering of the same.

27. In a molding machine, the combination with a flask, a table or pattern-plate, means for raising and lowering said flask and plate, flask supporting bars adapted to be raised by said plate, pawls engaging with ratchet-faces on said bars for holding the bars in their raised positions and for permitting the lowering of the same, shafts connected to said pawls, and a cross-shaft connected to said first named shafts.

28. In a molding machine, the combination with a flask, a table or pattern-plate, means for raising and lowering said flask and plate, flask supporting bars adapted to be raised by said plate, pawls engaging with ratchet-faces on said bars for holding said bars in their raised positions and for permitting the lowering of the same, shafts connected to said pawls, a trip lever on one of said shafts, a cross-shaft, arms on said shafts and cross-shaft, and rods connected to said arms.

In testimony whereof, we the said CHARLES HERMAN, MARTIN L. HEYL and HARRY T. FRAUENHEIM have hereunto set our hands.

CHARLES HERMAN.
MARTIN L. HEYL.
HARRY T. FRAUENHEIM.

Witnesses:
ZENAS MCMICHAEL,
R. E. GALLAGHER.